United States Patent
Ahn et al.

(10) Patent No.: US 9,424,663 B2
(45) Date of Patent: *Aug. 23, 2016

(54) APPARATUS AND METHOD FOR CODING A THREE DIMENSIONAL MESH

(71) Applicants: SAMSUNG ELECTRONICS CO., LTD., Suwon-si (KR); Korea University Industrial & Academic Collaberation Foundation, Seoul (KR)

(72) Inventors: Min Su Ahn, Seoul (KR); Jeong Hwan Ahn, Suwon-si (KR); Jae Kyun Ahn, Seoul (KR); Dae Youn Lee, Seoul (KR); Chang Su Kim, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 96 days.

This patent is subject to a terminal disclaimer.

(21) Appl. No.: 14/310,514

(22) Filed: Jun. 20, 2014

(65) Prior Publication Data

US 2014/0300598 A1  Oct. 9, 2014

Related U.S. Application Data

(63) Continuation of application No. 12/905,607, filed on Oct. 15, 2010.

(30) Foreign Application Priority Data

Oct. 16, 2009  (KR) .................. 10-2009-0098952
Apr. 14, 2010  (KR) .................. 10-2010-0034488

(51) Int. Cl.
 G06K 9/36   (2006.01)
 G06T 9/00   (2006.01)
 G06T 17/20  (2006.01)

(52) U.S. Cl.
 CPC . *G06T 9/001* (2013.01); *G06T 9/00* (2013.01); *G06T 17/20* (2013.01); *G06T 17/205* (2013.01)

(58) Field of Classification Search
 None
 See application file for complete search history.

(56) References Cited

U.S. PATENT DOCUMENTS 7,003,169 B1    2/2006  Lechat et al.
2007/0242894 A1  10/2007  Kautzer et al.

FOREIGN PATENT DOCUMENTS

| JP | 2002-109567   | 4/2002  |
| JP | 2003-153228 A | 5/2003  |
| JP | 2003-317111   | 11/2003 |
| KR | 10-2006-0087647 | 8/2006 |

(Continued)

OTHER PUBLICATIONS

Shaffer, Eric, and Michael Garland. "Efficient adaptive simplification of massive meshes." Proceedings of the conference on Visualization'01. IEEE Computer Society, 2001.*

(Continued)

*Primary Examiner* — Nirav G Patel
(74) *Attorney, Agent, or Firm* — NSIP Law

(57) ABSTRACT

Disclosed is a three-dimensional (3D) mesh compression apparatus and method. The 3D mesh compression apparatus may generate a base mesh through a mesh simplification, may separately compress the base mesh and vertices eliminated by the simplification, and may compress 3D mesh data based on the covariance matrix.

11 Claims, 12 Drawing Sheets

(56) References Cited

FOREIGN PATENT DOCUMENTS

| KR | 10-2009-0025672 | 3/2009 |
|---|---|---|
| KR | 10-2009-0080423 | 7/2009 |

OTHER PUBLICATIONS

Brodsky, Dmitry, and Benjamin Watson. "Model simplification through refinement." Graphics Interface. vol. 2000. 2000.*

ISO/IEC JTC1/SC29/WG11, "Text of ISO/IEC 14496-16:2011 AMD 2 Multi-Resolution 3D Mesh Compression," Jul. 2011.*

European Search Report issued on Jun. 18, 2013 for the corresponding European Patent Application No. 10823566.4.

"Karhunen-Loève Transform for Geometry Compression of 3D Mess", Acta Electrotennica, vol. 47, No. 2, 2006, pp. 73-78.

U.S. Restriction Requirement mailed Nov. 26, 2012 in copending U.S. Appl. No. 12/905,607.

U.S. Office Action mailed Feb. 4, 2013 in copending U.S. Appl. No. 12/905,607.

Jae-Kyun Ahn et al., "Progressive compression of 3D triangular meshes using topology-based Karhunen-Loève transform," Image Processing (ICIP), 2010 17$^{th}$ IEEE International Conference, pp. 3417-3420, Sep. 26-29, 2010.

U.S. Notice of Allowance mailed May 24, 2013 in copending U.S. Appl. No. 12/905,607.

David Lon Page, 2003, Part Decomposition of 3d Surfaces, Ph.D. Dissertation. The University of Tennessee. AAI3092829.

U.S. Supplemental Notice of Allowability mailed Jun. 25, 2013 in copending U.S. Appl. No. 12/905,607.

U.S. Office Action mailed Aug. 21, 2013 in copending U.S. Appl. No. 12/905,607.

U.S. Notice of Allowance mailed Dec. 6, 2014 in copending U.S. Appl. No. 12/905,607.

U.S. Notice of Allowance mailed Mar. 20, 2014 in copending U.S. Appl. No. 12/905,607.

U.S. Appl. No. 12/905,607, filed Oct. 15, 2010, Min Su Ahn et al., Samsung Electronics Co., Ltd. and Korea University Industrial & Academic Collaboration Foundation.

Korean Office Action issued on Feb. 12, 2016 in counterpart Korean Application No. 10-2010-0034488 (9 pages in Korean with partial English translation).

* cited by examiner

APPARATUS AND METHOD FOR CODING A THREE DIMENSIONAL MESH

CROSS-REFERENCE TO RELATED APPLICATIONS

This application is a U.S. continuation application filed under 37 USC 1.53(b) claiming priority benefit of U.S. Ser. No. 12/905,607 filed in the United States on Oct. 15, 2010, which claims earlier priority benefit of Korean Patent Application No. 10-2009-0098952, filed on Oct. 16, 2009 and the benefit of Korean Patent Application No. 10-2010-0034488, filed Apr. 14, 2010, in the Korean Intellectual Property Office, the disclosure of which is incorporated herein by reference.

BACKGROUND

1. Field

Example embodiments relate to a three-dimensional (3D) mesh compression apparatus and method, and more particularly, to a technology that constructs a covariance matrix based on a topological distance between vertices, and encodes geometric information associated with an eliminated vertex based on the covariance matrix.

2. Description of the Related Art

A three-dimensional (3D) mesh may generally use a large amount of storage space, a large amount of calculations, a broad transmission bandwidth, and the like. Particularly, when a complexity of the mesh increases, a greater storage space and a higher bandwidth of a network used for transmission are used, and thus, there is a difficulty in utilizing the mesh. Therefore, there is a desire for a compression of a 3D object for effective transmission, storage, and rendering of mesh data.

A 3D mesh model may be constituted of connectivity information, geometric information, and feature information. The connectivity information may indicate a relationship between adjacent vertexes, the geometric information may indicate a 3D location coordinate of each vertex, and the feature information may indicate a color of the mesh, a direction of a perpendicular line of the mesh, a reflection rate of the mesh, and the like.

Here, the geometric information may be coded based on a residual vector between geometric information at a predicted point, and geometric information at an actual point. However, the residual vector of the geometric information may not be constant based on a predicted triangle, and, when two triangles are not in a form of a parallelogram, the residual vector may increase, thereby decreasing a compression performance.

Thus, there is a desire for a 3D mesh compression apparatus and method that increases a compression rate of the geometric information, thereby providing an excellent compression rate.

SUMMARY

According to an aspect, there is provided an a three-dimensional (3D) mesh compression apparatus including a mesh simplifying unit to generate a base mesh by simplifying an inputted 3D mesh, a base mesh coding unit to code the base mesh, and a vertex coding unit to code, based on a covariance matrix, at least one vertex eliminated by the simplification.

The 3D mesh compression apparatus may further include an entropy coding unit to transform the coded base mesh and the coded at least one vertex into a bit stream by performing entropy-coding.

According to an embodiment, the entropy coding unit may record a Most Significant Bit (MSB) or a Least Significant Bit (LSB) first among geometric information associated with the coded base mesh and geometric information associated with the at least one coded vertex to transform the recorded MSB and/or the recorded LSB into a bit stream.

The vertex coding unit may include a geometric information estimating unit to estimate geometric information associated with the at least one eliminated vertex, a segmentation unit to segment the base mesh into at least one area, a matrix generating unit to generate the covariance matrix based on connectivity information between the at least one eliminated vertex, a domain-transforming unit to perform a domain-transform based on the estimated geometric information and the covariance matrix, and a quantization unit to quantize a coefficient calculated by the domain-transform.

The geometric estimating unit may perform estimating geometric information based on each local coordinate of a plurality of triangles, and a tangent vector of a first local coordinate of a first triangle among the plurality of triangles may be determined by projecting, onto a plane including the first triangle, a tangent vector of a second local coordinate of a second triangle adjacent to the first triangle.

The matrix generating unit may perform calculating a topological distance between the at least one eliminated vertex, and generating the covariance matrix including a covariance determined based on the topological distance, as an element.

According to an embodiment, the domain-transforming unit may include an eigenvector calculating unit to calculate at least one eigenvector by performing eigenvector decomposition of the covariance matrix, and a coefficient calculating unit to calculate a coefficient of each of the at least one eigenvectors by calculating an inner product between the at least one eigenvector and at least one residual vector that is calculated through the estimation of the geometric information.

According to another embodiment, the coefficient calculating unit may calculate a coefficient of each of the at least one eigenvectors by calculating an inner product between the at least one eigenvector and at least one element of at least one residual vector that is calculated through the estimation of the geometric information.

The quantization unit may differently set a number of bits allocated to the quantization based on an importance of a coefficient extracted through the domain-transform.

According to another aspect, there is provided an a 3D mesh decoding apparatus including an entropy decoding unit to extract restoration information to restore the 3D mesh by entropy-decoding of an inputted bit stream, a base mesh decoding unit to decode a base mesh based on the restoration information, a vertex decoding unit to restore an eliminated vertex based on a covariance matrix, and a mesh restoring unit to restore the 3D mesh based on the restored vertex data and the base mesh.

According to still another aspect, there is provided a 3D mesh compression method including generating a base mesh by simplifying an inputted 3D mesh, coding the base mesh, and coding at least one vertex eliminated by the simplification, based on a covariance matrix.

The 3D mesh compression method may further include transforming the coded base mesh and the coded at least one vertex into a bit stream by performing entropy-coding.

According to an embodiment, the transforming may include recording an MSB first among the coded base mesh and geometric information associated with the at least one coded vertex to transform the recorded MSB into a bit stream.

According to another embodiment, the transforming may include recording an LSB first among the coded base mesh and geometric information associated with the at least one coded vertex to transform the recorded LSB into a bit stream.

The coding based on the covariance matrix may include estimating geometric information associated with the at least one eliminated vertex, segmenting the base mesh into at least one area, generating the covariance matrix based on connectivity information between the at least one eliminated vertex, performing a domain-transform based on the estimated geometric information and the covariance matrix, and quantizing a coefficient calculated through the domain-transform.

The generating may perform calculating a topological distance between the at least one eliminated vertex, and generating the covariance matrix including a covariance determined based on the topological distance, as an element.

According to an embodiment, the performing of the domain-transform may include calculating at least one eigenvector by performing eigenvector decomposition of the covariance matrix, and calculating a coefficient of each of the at least one eigenvector by calculating an inner product between the at least one eigenvector and at least one residual vector that is calculated through the estimation of the geometric information.

According to another embodiment, the performing of domain-transforming may include calculating at least one eigenvector by performing eigenvector decomposition of the covariance matrix, and calculating a coefficient of each of the at least one eigenvectors by calculating an inner product between the at least one eigenvector and at least one element of at least one residual vector that is calculated through the estimation of the geometric information.

According to another aspect, there is provided a geometric information estimation method that estimates geometric information of a vertex eliminated through mesh-simplification, and the geometric information estimation method may include determining a first predictive point of a first triangle of a base mesh and a second predictive point of a second triangle adjacent to the first triangle, determining a local coordinate of the first predictive point based on a normal vector and a tangent vector at the first predictive point, and an outer product vector between the normal vector and the tangent vector, determining a local coordinate of the second predictive point by projecting, onto a plane including the second triangle, the tangent vector of the first predictive point, and estimating the geometric information of the eliminated vertex based on the local coordinates of the triangles.

The determining of the local coordinate of the second predictive point may include calculating an inner product of the normal vector of the first predictive point with a normal vector of the second predictive point, determining a tangent vector of the second predictive point by projecting the tangent vector of the first predictive point onto a plane including the second triangle, when the inner product is a positive number, determining, as the tangent vector of the second predictive point, an inverse vector of a vector obtained by projecting the tangent vector of the first predictive point onto the plane including the second triangle, when the inner product is a negative number, determining, as the tangent vector of the second predictive point, one of the normal vector of the first predictive point and an inverse vector of the normal vector of the first predictive point, when the inner product is zero, and determining the local coordinate of the second predictive point based on the tangent vector of the second predictive point, the normal vector of the second predictive point, an outer product vector between the tangent vector of the second predictive point and the normal vector of the second predictive vector.

The determining, as the tangent vector of the second predictive point, of the one of the normal vector of the first predictive point and the inverse vector of the normal vector of the first predictive point may perform determining the inverse vector of the normal vector of the first predictive point as the tangent vector of the second predictive point, when the tangent vector of the first predictive point is identical to the normal vector of the second predictive point, and determining the normal vector of the first predictive point as the tangent vector of the second predictive point, when the tangent vector of the first predictive point is identical to an inverse vector of the normal vector of the second predictive point.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
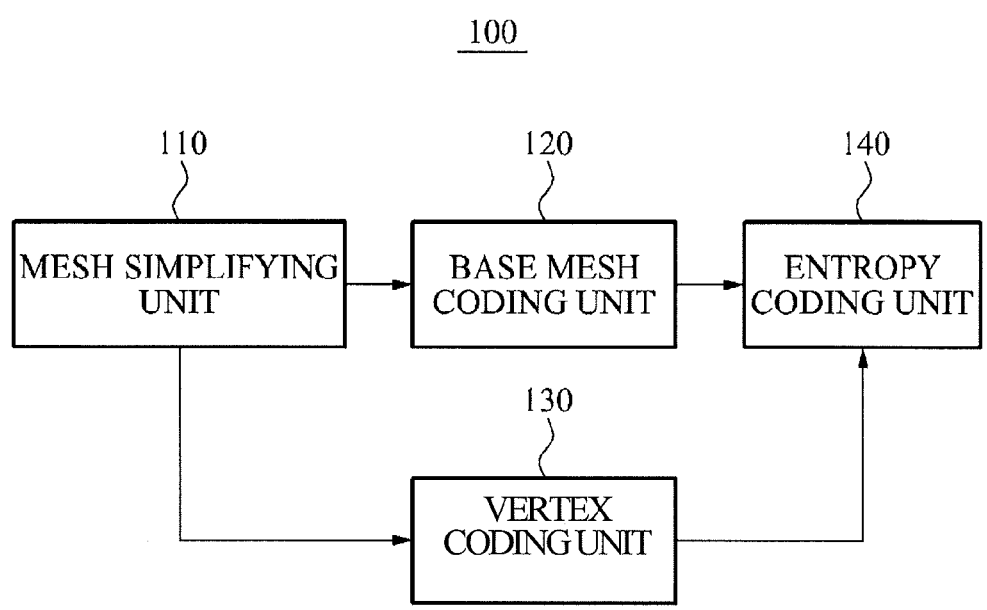
FIG. 1 is a block diagram illustrating a three-dimensional (3D) mesh compression apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures FIG. 1 illustrates a three-dimensional (3D) mesh compression apparatus 100 according to example embodiments.

Referring to FIG. 1, the 3D mesh compression apparatus 100 may include a mesh simplifying unit 110, a base mesh coding unit 120, and a vertex coding unit 130. Also, the 3D mesh compression apparatus 100 may further include an entropy coding unit 140.

The mesh simplifying unit 110 may generate a base mesh by simplifying an inputted 3D mesh. In this instance, various methods may be used for the simplification of the mesh, and when vertices eliminated through the simplification of the mesh are uniformly distributed on an entire mesh surface, the simplification may be more effectively performed. Also, the mesh may be simplified based on only connectivity information to enable a decoder to restore the simplified mesh and to restore an original input mesh based on the restored simplified mesh. In this instance, the simplification of the mesh may be iteratively performed for several iterations, a number of the iteration depending on a number of vertices of the inputted mesh. When the simplification is iteratively performed, a mesh simplified in a previous operation may be used as a new inputted mesh and the same process is performed. A number of the simplification is adaptively selected based on a model, and thus, a compression efficiency is optimized.

The inputted mesh is classified into the simplified mesh and geometric information associated with eliminated vertices through the simplification, and connectivity information used for the simplification of the mesh or restoration of the simplified mesh may be coded. An example embodiment of a process of simplifying the mesh will be described with reference to FIG. 2.

Figure 2:
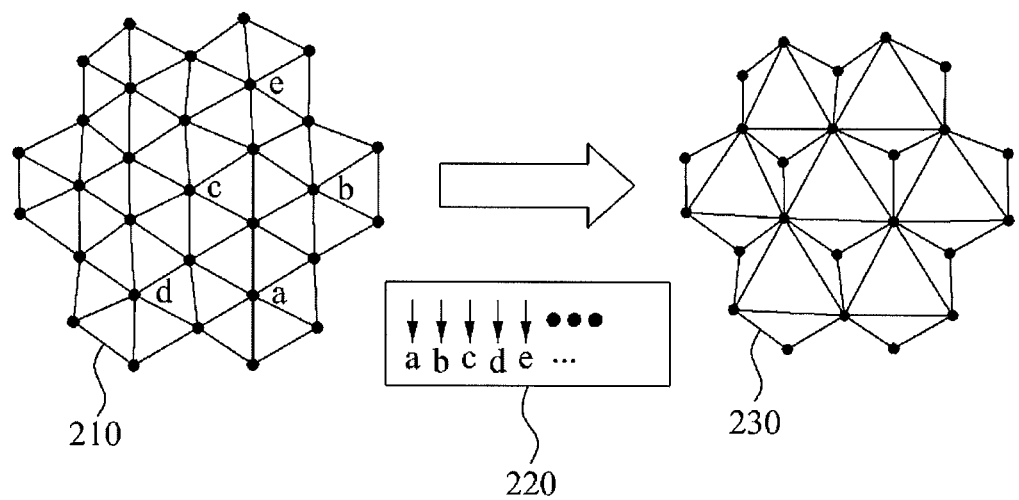
FIG. 2 is a diagram illustrating a process of simplifying a mesh according to example embodiments.

Referring to FIG. 2, an inputted mesh 210 may be simplified by eliminating a single vertex for each hexagon patch of the mesh 210. Accordingly, the mesh 210 may be classified into an eliminated vertex 220 and a base mesh 230 through the simplification.

Referring to FIG. 1, the base mesh coding unit 120 may code the base mesh 230 generated by the mesh simplifying unit 110. In this instance, connectivity information of the base mesh and geometric information of the base mesh may be coded through a single-rate compression, and various methods, such as a method selected by a user or a method that is variable, in addition to the single-rate compression, may be applied.

The vertex coding unit 130 may code at least one vertex eliminated through the simplification, based on a covariance matrix. The vertex coding unit 130 will be described in detail with reference to FIG. 3.

Figure 3:
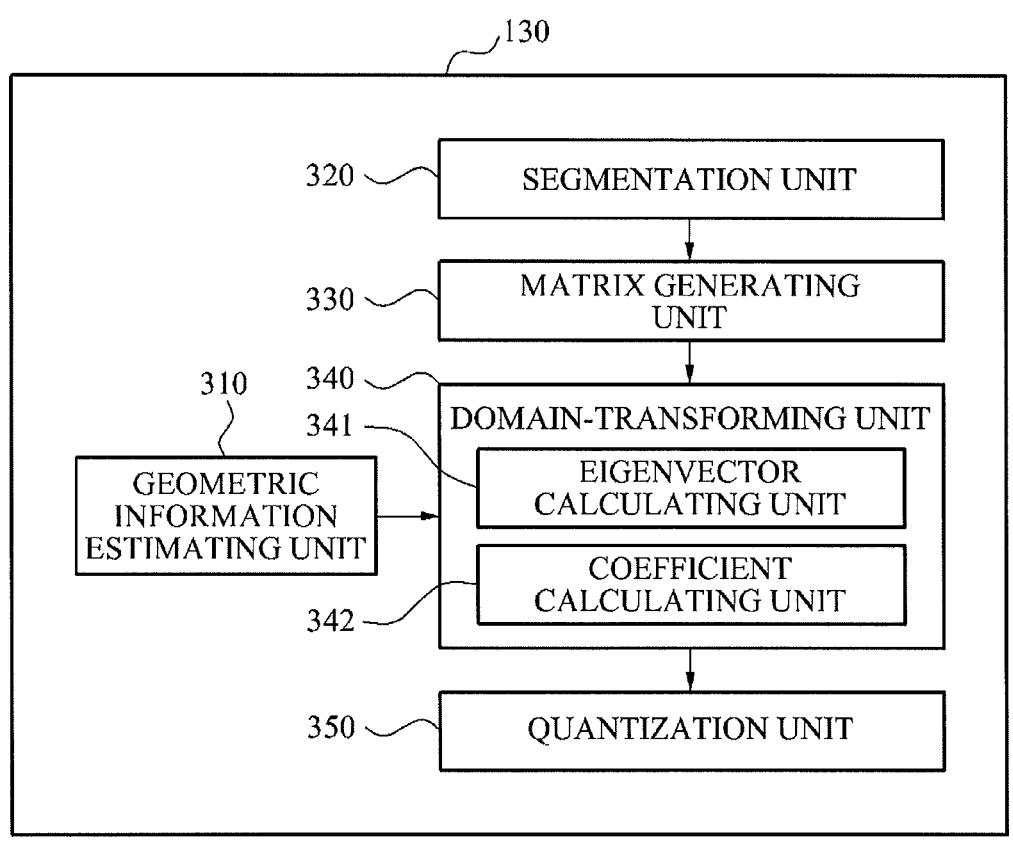
FIG. 3 is a diagram illustrating a detailed format of a vertex coding unit in the 3D mesh compression apparatus of FIG. 1.

FIG. 3 illustrates a detailed format of a vertex coding unit in the 3D mesh compression apparatus of FIG. 1.

Referring to FIG. 3, a vertex coding unit 130 may include a geometric information estimating unit 310, a segmentation unit 320, a matrix generating unit 330, a domain-transforming unit 340, and a quantization unit 350.

The geometric information estimating unit 310 may estimate geometric information of at least one eliminated vertex. A local coordinate is used for estimation of the geometric information and a direction between local coordinates of adjacent triangles is maintained to be constant. As an example, the geometric information estimating unit 310 may estimate geometric information based on each local coordinate of a plurality of triangles, and may determine a tangent vector of a first local coordinate of a first triangle among the plurality of triangles by projecting a tangent vector of a second local coordinate of a second triangle adjacent to the first triangle onto a plane including the first triangle. A process of estimating the geometric information will be described in detail with respect to FIGS. 4 and 5.

Figure 4:
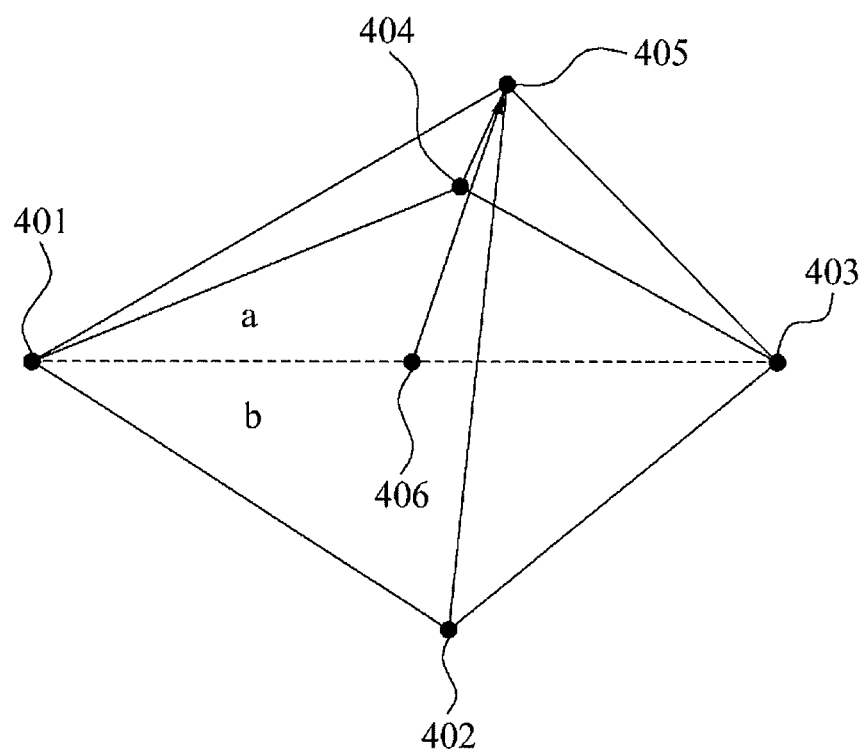
FIG. 4 is a diagram illustrating a process of estimating geometric information according to example embodiments.

FIG. 4 illustrates a process of estimating geometric information according to example embodiments.

A residual vector may be generated in a local coordinate system to increase a geometric information compression rate of eliminated vertices. Vertex information associated with a vertex of a simplified mesh may be used to generate the residual vector. Referring to FIG. 4, a location prediction may be performed for generating the residual vector. When a vertex (1) 401, a vertex (2) 402, a vertex (3) 403, and a vertex (4) 404 are vertices of the simplified mesh, and a vertex (5) 405 is the eliminated vertex, a vertex (6) 406 that is an average location of the vertex (1) 401, the vertex (2) 402, the vertex (3) 403, and the vertex (4) 404 may be used as a predictive value of the vertex (5) 405.

A process of maintaining a direction between adjacent local coordinates to be constant in the local coordinate system for generating the residual vector will be described in detail with reference to FIG. 5.

Figure 5:
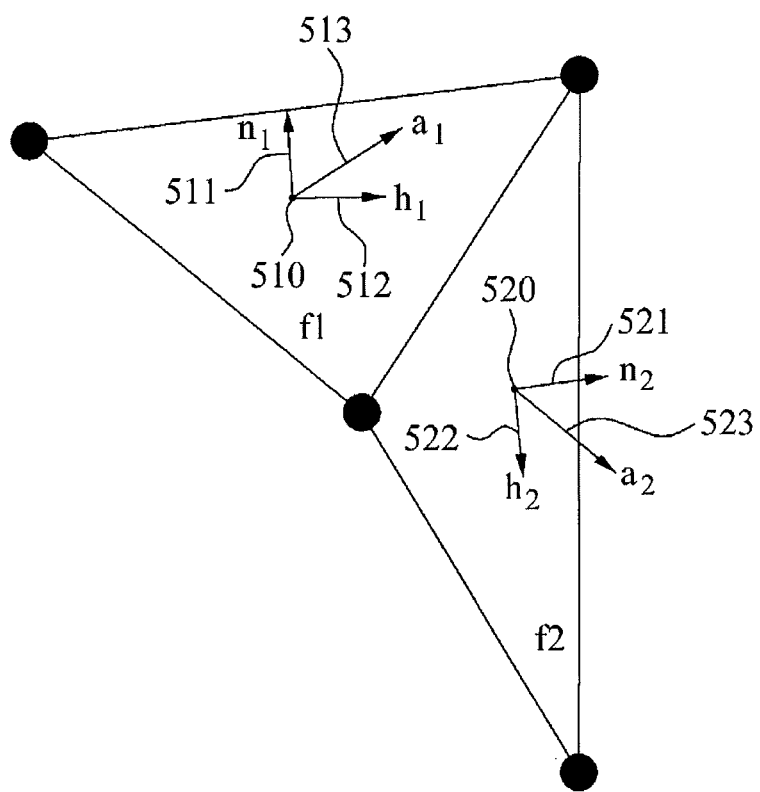
FIG. 5 is a diagram illustrating a process of maintaining a direction of an adjacent local coordinate to be constant according to example embodiments.

FIG. 5 illustrates a process of maintaining a direction of an adjacent local coordinate to be constant according to example embodiments.

Referring to FIG. 5, to set a local coordinate, a normal vector (n1) 511 and a normal vector (n2) 521 are calculated at adjacent predictive points, namely, at a first predictive point 510 and at a second predictive point 520, respectively. When a local coordinate of the first predictive point 510 is calculated based on the n1 511 of the first predictive point 510, a tangent vector (h1) 512 of the first predictive point 510, and an outer product vector 513 between the n1 511 and the h1 512, a vector that is obtained by projecting the h1 512 of the first predictive point 510 onto a mesh plane of a second predictive point 520 may be used as a tangent vector (h2) 522 of the second predictive point 520. Accordingly, a local coordinate of the second predictive point 520 may be calculated based on the n2 521 of the second predictive point 520, the h2 522 of the second predictive point 520, and an outer product vector 523 between the n2 521 and the h2 522.

A projecting method may be changed based on an inner product value between adjacent normal vectors to maintain a consistency of a local coordinate system. That is, when the inner product value between n1 511 and n2 521 is a positive number, the h1 512 is projected as is to determine the h2 522, and when the inner product value is a negative number, the h1 512 is projected and an inverse vector of the projected vector may be determined as the h2 522. When the inner project value is zero and the h1 512 and n2 521 are equivalent, the h2 522 is determined as an inverse vector of the n1 511 and when the h1 512 and an inverse vector of the n2 521 are equivalent, the h2 522 is determined as the n1 511.

The segmentation unit 320 may segment a base mesh into at least one area. According to example embodiments, when a domain-transform method is applied to analyze a relationship between eliminated vertices, a method that segments an inputted mesh into at least one area and separately performs a transform of geometric information for each segmented area, may be used, since a complexity of the domain-transform method increases in proportion to a number of eliminated vertices. The domain-transform is used for compressing geometric information of a vertex, and may indicate transform of geometric information of a 3D coordinate system into geometric information of a different coordinate system. In this instance, the domain-transform may use a Karhunen-Loeve Transform (KLT), a discrete cosine transform (DCT), and the like.

The segmentation unit 320 may segment the area based on mesh information simplified for synchronization with a decoder.

When a form of the segmented area is closer to a plane, a value of a residual vector is closer to a predictive value, thereby being effective in the compression. Accordingly, a mesh segmentation may use geometric information, and a triangle having a similar normal line among adjacent triangles may be included in the same segmented area. Therefore, the mesh segmentation may be performed based on adjacency information between triangles and a normal vector of a triangle. However, various segmentation schemes may be applied based on the input mesh to increase efficiency of the domain-transform, and as an example, a user may manually select, through an input, an area that is to be segmented.

The matrix generating unit 330 may generate a covariance matrix based on connectivity information between at least one eliminated vertex. That is, when the domain-transform is performed to compress the geometric information associated with the eliminated vertices according to example embodiments, the covariance matrix is used for calculating a domain-transform matrix.

A topological distance of the eliminated vertices may be calculated to generate the covariance matrix, and the topological distance may be calculated by determining whether a patch that is constructed during the simplification is adjacent. Even though a decoder may not know the geometric information associated with the eliminated vertices through the simplified mesh, the decoder may obtain connectivity information, thereby constructing a covariance matrix equivalent to a covariance matrix of an encoder. An example embodiment of topological connectivity information between the eliminated vertices will be described with reference to FIG. 6.

Figure 6:
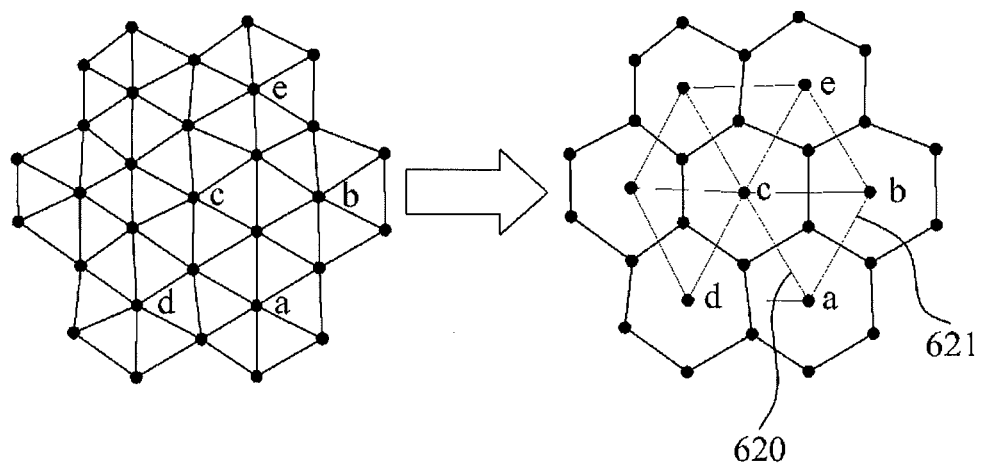
FIG. 6 is a diagram illustrating connectivity information between eliminated vertices according to example embodiments.

Referring to FIG. 6, a topological distance 621 between "a" and "b" is "1" and a topological distance 620 between "d" and "e" is "2". Accordingly, a correlation between "a" that is an eliminated vertex with another eliminated vertex may be higher as a distance between "a" and the other eliminated vertex is shorter, and thus, a covariance between the eliminated vertices may be expressed based on a topological distance. Therefore, as the topological distance becomes longer, a covariance of corresponding vertexes may decrease. An example of a covariance matrix M estimated through the topological distance between the vertices is as given below.

$$M = \begin{bmatrix} 1 & \cdots & \rho^{N_{1j}} & \cdots & \rho^{N_{1m}} \\ \vdots & \ddots & \rho^{N_{ij}} & & \vdots \\ \rho^{N_{i1}} & \cdots & 1 & \cdots & \rho^{N_{im}} \\ \vdots & \rho^{N_{ji}} & & \ddots & \vdots \\ \rho^{N_{m1}} & \cdots & \rho^{N_{mj}} & \cdots & 1 \end{bmatrix}$$

In this example, $\rho$ denotes a correlation coefficient having a value between −1 and 1, and $N_{ij}$ denotes a topological distance between an eliminated vertex i and an eliminated vertex j.

Referring again to FIG. 3, the domain-transforming unit 340 may perform domain-transform based on estimated geometric information and the covariance matrix. Here, the domain-transforming unit 340 may include an eigenvector calculating unit 341 and a coefficient calculating unit 342.

The eigenvector calculating unit 341 may calculate at least one eigenvector by performing eigen-vector decomposition of the covariance matrix. Here, the eigenvector $\phi k$ may satisfy the following Equation 1:

$$M[\phi_k] = \lambda_k[\phi_k].$$ [Equation 1]

In this example, $\lambda_k$ denotes an eigenvalue.

According to an embodiment, the coefficient calculating unit 342 may calculate a coefficient of each of the at least one eigenvectors by calculating an inner product between the at least one eigenvector and at least one residual vector calculated through the estimation of the geometric information.

According to another embodiment, the coefficient calculating unit 342 may calculate the coefficient of each of the at least one eigenvectors by calculating an inner product between the at least one eigenvector and at least one element of at least one residual vector that is calculated through the estimation of the geometric information.

Here, the coefficient may be calculated from a coefficient $(a_k, b_k, c_k)$ of Equation 2:

$$\begin{bmatrix} a_1 & b_1 & c_1 \\ \vdots & \vdots & \vdots \\ a_k & b_k & c_k \\ \vdots & \vdots & \vdots \\ a_m & b_m & c_m \end{bmatrix} \begin{bmatrix} \phi_1 \\ \vdots \\ \phi_k \\ \vdots \\ \phi_m \end{bmatrix} = \begin{bmatrix} x_1 & y_1 & z_1 \\ \vdots & \vdots & \vdots \\ x_k & y_k & z_k \\ \vdots & \vdots & \vdots \\ x_m & y_m & z_m \end{bmatrix}.$$ [Equation 2]

In this example, the geometric information is a 3D vector constructing $(x_k, y_k, z_k)$, and thus, a coefficient $(a_k, b_k, c_k)$ is also constructed by the 3D vector, and a domain-transform matrix for each coordinate is equally applied.

Also, the decoder may superposition eigenvectors by using the coefficient as a weight, thereby obtaining residual vectors equivalent to residual vectors of the encoder.

The domain-transform scheme may be used as a tool for analyzing an adjacency relationship between the eliminated vertices, and may apply various transform schemes for analyzing the adjacency relationship between the eliminated vertices.

A quantization unit 350 may quantize the coefficient calculated by the domain transform. Here, an absolute value of a coefficient at a forward part of the domain-transform matrix is large, and an absolute value of a coefficient at a rear part of the domain is small, and thus, a number of bits used for quantization of the coefficient may be differently applied based on an importance of the coefficient. That is, a large number of bits may be used for quantization of a coefficient having a relatively high importance, whereas a small number of bits may be used for quantization of a coefficient having a relatively low importance, and thus, a compression performance may be optimized. Also, when simplification is iteratively performed for several iterations, an importance of geometric information at a coarser level increases, and thus, a quantized bit may be adaptively changed based on a simplification level and the adaptively changed quantized bit may be applied.

Referring again to FIG. 1, an entropy-coding unit 140 may transform a coded base mesh and at least one coded vertex into a bit stream by performing entropy-coding of the coded base mesh and the at least one coded vertex.

Coded data may be transmitted after being transformed into the bit stream through the entropy-coding unit 140. Data to be coded may be constituted by connectivity information of the base mesh, geometric information of the base mesh, connectivity information of eliminated vertices that is eliminated through the simplification, and geometric information of the eliminated vertices.

According to an embodiment, the geometric information of the eliminated vertices may be sequentially recorded in the bit stream, however, the recording may not be limited thereto.

According to another embodiment, a Most Significant Bit (MSB) among the geometric information of vertices in the same level may be recorded first, as opposed to the above embodiment where the geometric information of the eliminated vertices are sequentially recorded in the bit stream.

Relatively more significant bits among bits indicating the geometric information of vertices may be recorded first and relatively less significant bits may be sequentially recorded until a Least Significant Bit (LSB).

Depending on embodiments, the LSB may be recorded first and the MSB may be recorded lastly.

Each of the data to be coded may be compressed through an arithmetic coding. Geometric information of the eliminated vertices eliminated by the simplification may have different values and have different frequencies based on a location of the data. Accordingly, when the data is adaptively compressed for each segmented area, the performance may increase.

Figure 7:
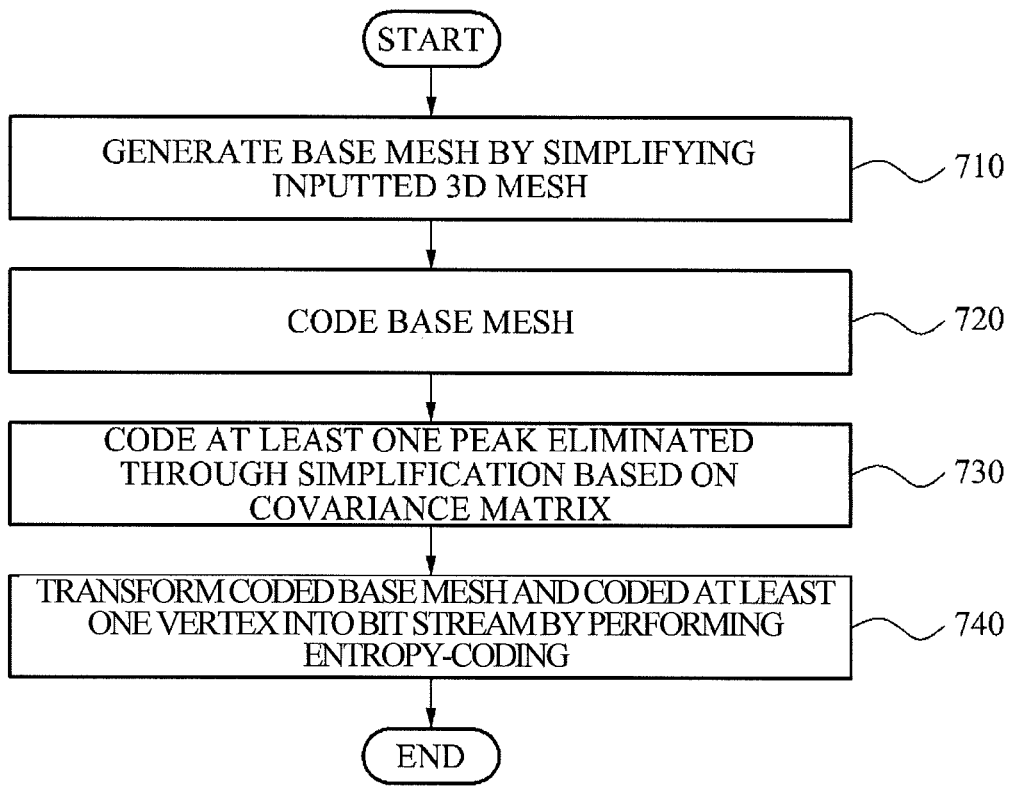
FIG. 7 is a flowchart illustrating a 3D mesh compression method according to example embodiments.

FIG. 7 illustrates a 3D mesh compression method according to example embodiments.

Referring to FIG. 7, a base mesh is generated by simplifying an inputted 3D mesh in operation 710. In this instance, the inputted 3D mesh may be classified, through the mesh simplification, into a base mesh and an eliminated vertex.

In operation 720, the base mesh is coded. In this instance, the coding of the base mesh may code connectivity information of the base mesh and geometric information using a single-rate compression.

In operation 730, at least one vertex eliminated through the simplification is coded based on a covariance matrix. Here, operation 730 will be further described with reference to FIG. 8.

Figure 8:
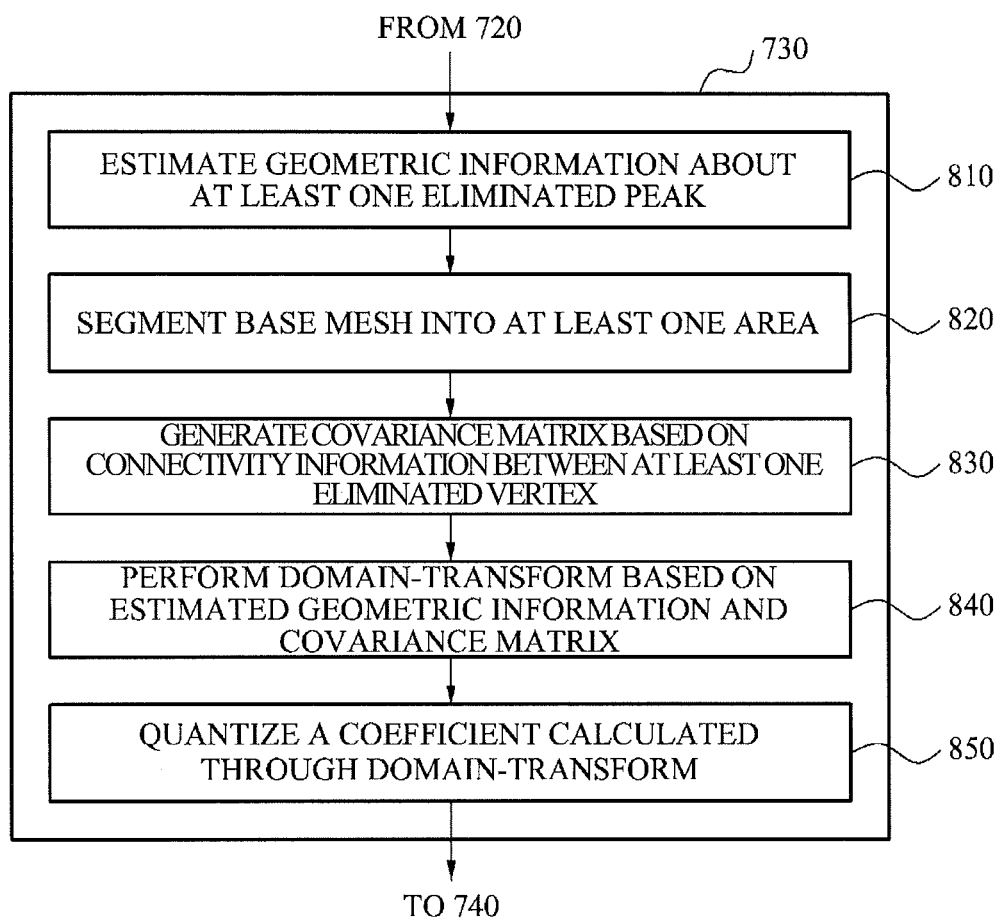
FIG. 8 is a diagram illustrating a detailed process of coding of FIG. 7 based on a covariance matrix.

FIG. 8 illustrates a detailed process of coding of FIG. 7 based on a covariance matrix.

Referring to FIG. 8, geometric information associated with at least one eliminated vertex is estimated in operation 810.

In operation 810, the geometric information is extracted based on each local coordinate of a plurality of triangles, and a tangent vector of a first local coordinate of a first triangle is determined by projecting, onto a plane including the first triangle, a tangent vector of a second local coordinate of a second triangle adjacent to the first triangle.

In operation 820, the base mesh is segmented into at least one area. Accordingly, coding may be performed for each segmented area.

In operation 830, a covariance matrix is generated based on connectivity information between at least one eliminated vertex. The covariance matrix may be expressed as m rows and m columns when a number of the at least one eliminated vertex is m, and includes, as each element of the matrix, an $n^{th}$ power of a correlation coefficient having a value between −1 and 1, and n denotes a topological distance between the at least one eliminated vertex.

In operation 840, a domain-transform is performed based on the estimated geometric information and the covariance matrix. Operation 840 may include an operation of calculating at least one eigenvector by performing eigenvector decomposition of the covariance matrix and an operation of calculating a coefficient of each of the at least one eigenvector by calculating an inner product between the at least one eigenvector and at least one residual vector that is calculated through the estimation of the geometric information.

According to another embodiment, a coefficient of each of the at least one eigenvector may be calculated by calculating an inner product between the at least one eigenvector and at least one element of at least one residual vector that is calculated through the estimation of the geometric information.

In operation 850, the coefficient calculated through the domain-transform is quantized. A number of bits allocated for the quantization may be differently set based on an importance of the coefficient extracted through the domain-transform.

Referring again to FIG. 7, in operation 740, the coded base mesh and coded at least one vertex may be transformed into a bit stream by entropy-coding of the coded base mesh and coded at least one vertex.

Figure 9:
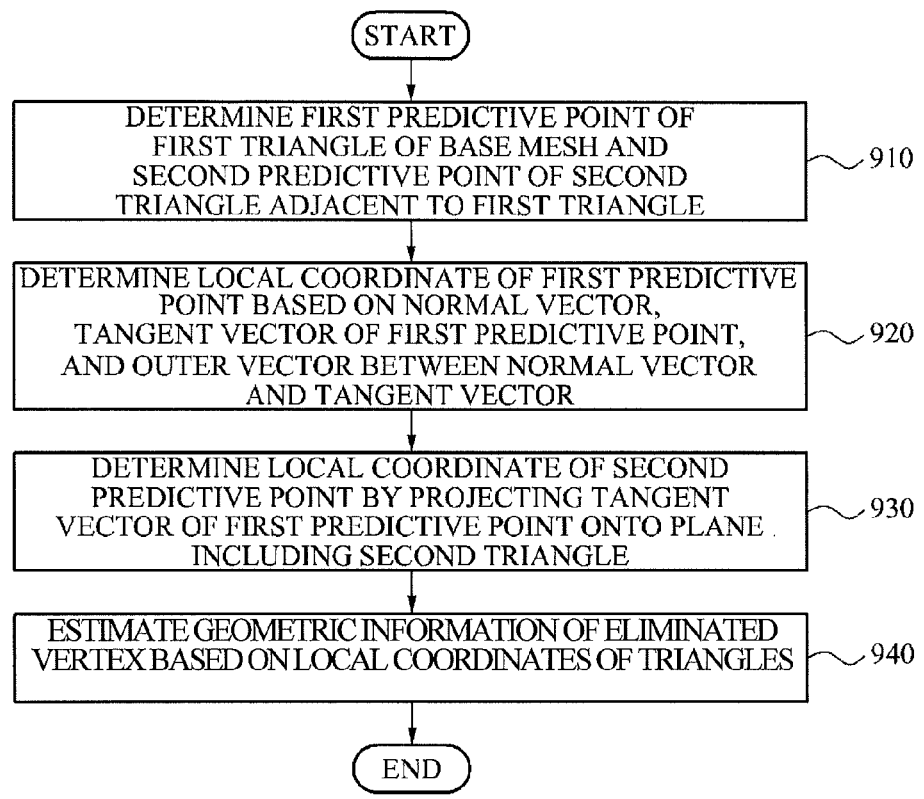
FIG. 9 is a flowchart illustrating a geometric information estimating method according to example embodiments.

FIG. 9 illustrates a geometric information estimating method according to example embodiments.

Referring to FIG. 9, in operation 910, a first predictive point of a first triangle of a base mesh and a second predictive point of a second triangle adjacent to the first triangle are determined. In this instance, each predictive point may be determined based on, as an example, an average vertex location of each triangle.

In operation 920, a local coordinate of the first predictive point is determined based on a normal vector of the first predictive point, a tangent vector of the first predictive point, and an outer product vector between the normal vector and the tangent vector.

In operation 930, a local coordinate of the second predictive point is determined by projecting, onto a plane including the second triangle, the tangent vector of the first predictive point. An inner product value between the normal vector of the first predictive point and a normal vector of the second predictive point may be calculated in operation 930. When the inner product value is a positive number, a tangent vector of the second predictive point may be determined by projecting the tangent vector of the first predictive point onto the plane including the second triangle. When the value of the inner product is a negative number, the tangent vector of the first predictive point is projected onto a plane including the second triangle, and an inverse vector of the projected vector is determined as the tangent vector of the second predictive point. When the inner product value is zero, one of the normal vector of the first predictive point and an inverse vector of the normal vector of the first predictive point is determined as the tangent vector of the second predictive point. Here, in a case where the inner product value is zero, when the tangent vector of the first predictive point is identical to the normal vector of the second predictive point, the inverse vector of the normal vector of the first predictive point is determined as the tangent vector of the second predictive point, and when the tangent vector of the first predictive point is identical to the normal vector of the second predictive point, the normal vector of the first predictive point is determined as the tangent vector of the second predictive point.

Next, the local coordinate of the second predictive point may be determined based on the tangent vector of the second predictive point, the normal vector of the second predictive point, and an outer product vector between the tangent vector and the normal vector.

In operation 940, geometric information associated with the eliminated vertex is estimated based on a local coordinate of each triangle.

Accordingly, the local coordinate is used for the estimation of the geometric information, and a direction between local coordinates is maintained to be consistent, and thus, an effective compression may be performed.

A 3D mesh decoding method and apparatus will be described. The decoding method and apparatus may be drawn from an inverse of the described coding method and apparatus.

Figure 10:
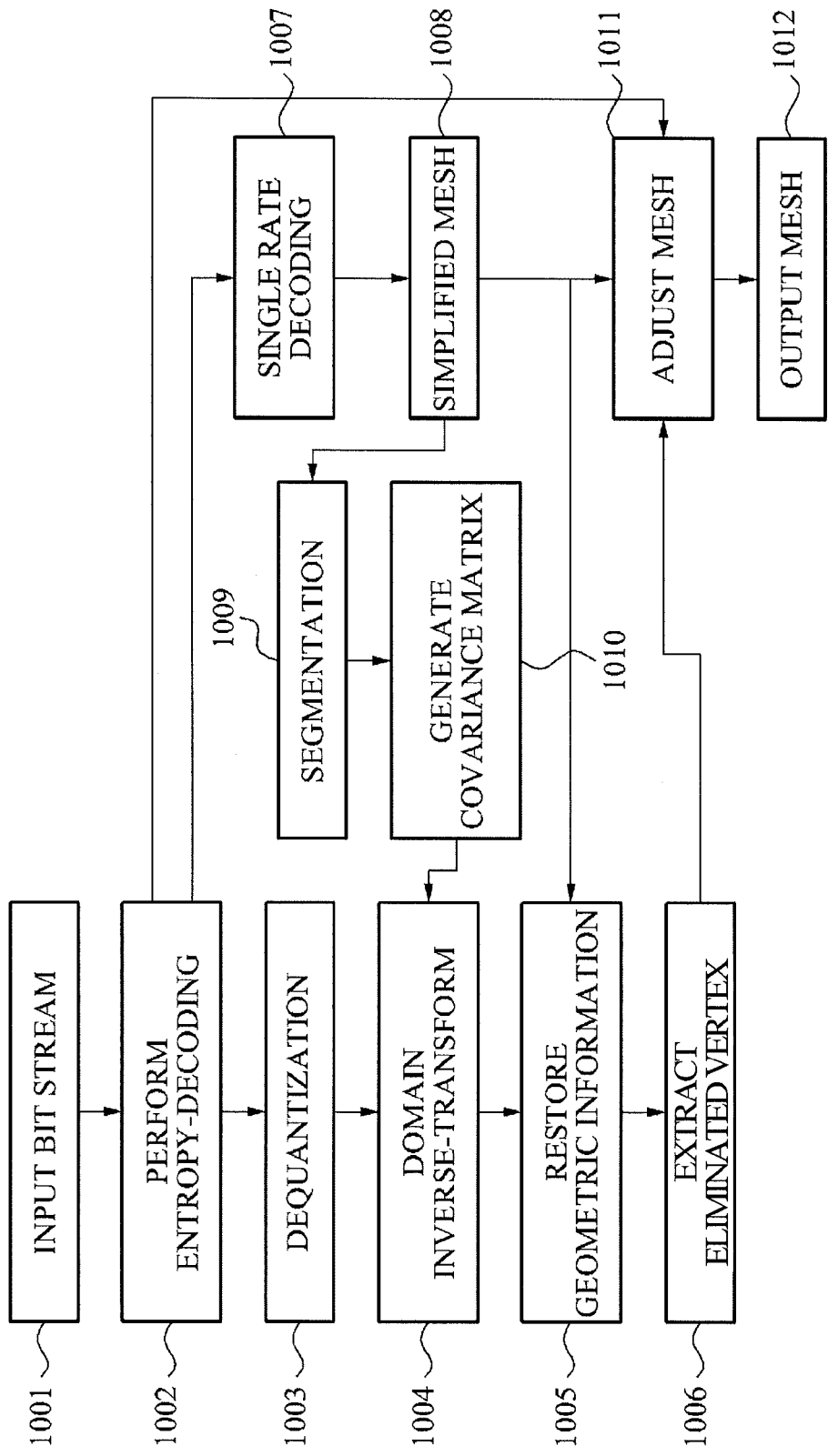
FIG. 10 is a diagram illustrating a 3D mesh decoding method according to example embodiments.

FIG. 10 illustrates a 3D mesh decoding method according to example embodiments. It is assumed that a KLT(domain-transform is used as an example of a domain-transform for compressing geometric information of eliminated vertices in FIG. 10.

Referring to FIG. 10, a coded bit stream is inputted in operation 1001 and the bit stream is entropy-decoded in operation 1002. A domain-transform coefficient quantized through the entropy-decoding, simplification connectivity information for restoring a simplified mesh, connectivity information of the simplified mesh, and geometric information of the simplified mesh may be extracted.

In operation 1003, a domain-transform coefficient is extracted by performing dequantization of the quantizied domain-transform coefficient.

In operation 1007 and operation 1008, the simplified mesh is generated by performing single-rate decoding of the connectivity information of the simplified mesh and the geometric information of the simplified mesh extracted in operation 1001.

The generated simplified mesh is segmented into areas in operation 1009 and a covariance matrix is generated for each segmented area in operation 1010.

In operation 1004, a 3D local coordinate is generated based on the domain-transform coefficient generated in operation 1003 and the covariance matrix generated in operation 1010.

In operation 1005 and operation 1006, data of a 3D global coordinate is generated based on the simplified mesh generated in operation 1008 and the 3D local coordinate generated in operation 1004, and eliminated vertex data is restored.

A mesh is restored based on the restored vertex data and the simplified mesh in operation 1011, and the restored 3D mesh is outputted in operation 1012.

Figure 11:
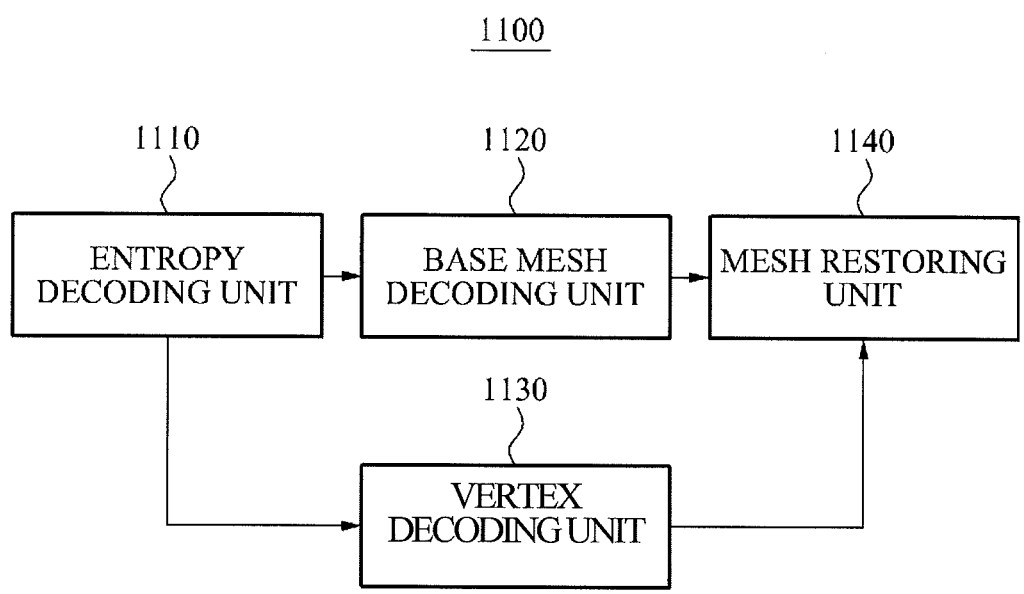
FIG. 11 is a block diagram illustrating a 3D mesh decoding apparatus according to example embodiments.

FIG. 11 illustrates a 3D mesh decoding apparatus according to example embodiments.

Referring to FIG. 11, the 3D mesh coding apparatus 1100 may include an entropy decoding unit 1110, a base mesh decoding unit 1120, a vertex decoding unit 1130, and a mesh restoring unit 1140.

The entropy decoding unit 1110 may extract restoration information for restoring a 3D mesh by entropy-decoding of an inputted bit stream. In this instance, a quantized coefficient that is quantized through the entropy-decoding, simplification connectivity information for restoring the simplified mesh, connectivity information of the simplified mesh, geometric information of the simplified mesh, and the like may be extracted.

The base mesh decoding unit 1120 may restore a base mesh based on the restoration information. As an example, connectivity information of the base mesh and geometric information of the base mesh extracted from the entropy-deciding unit 1110 may be single-rate decoded, and thus, the base mesh may be restored.

The vertex decoding unit 1130 may restore an eliminated vertex based on a covariance matrix. Here, the vertex decoding unit 1130 will be further described with reference to FIG. 12.

Figure 12:
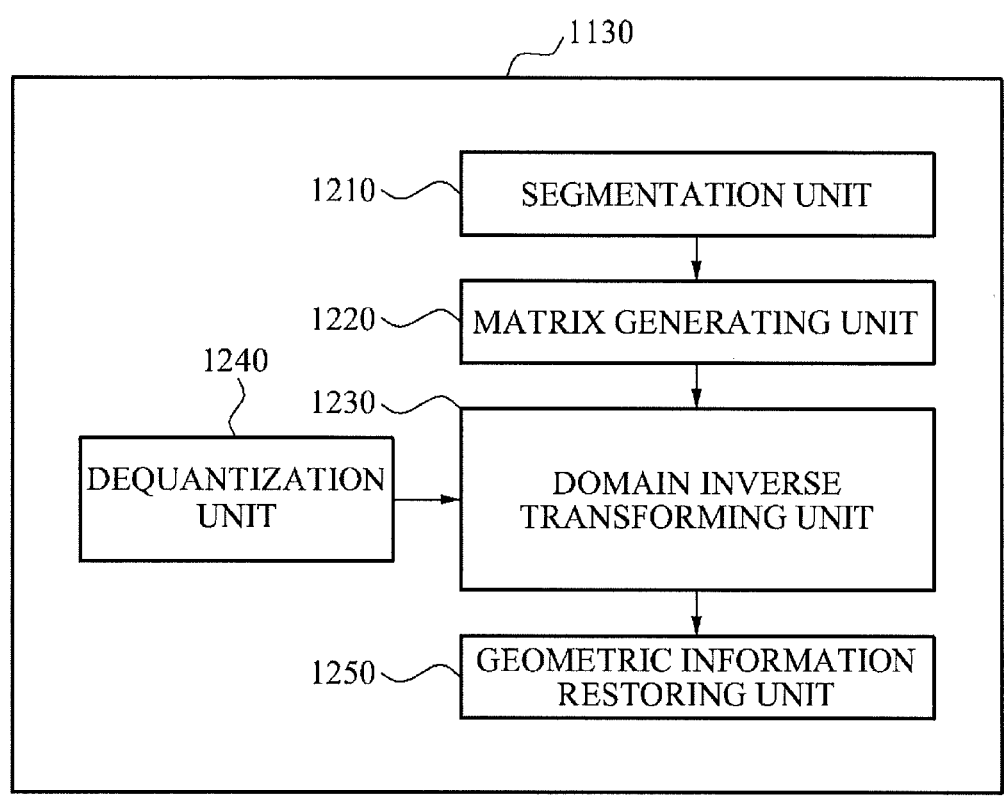
FIG. 12 is a diagram illustrating a vertex decoding unit in the 3D mesh decoding apparatus of FIG. 11, in detail.

FIG. 12 illustrates a vertex decoding unit in the 3D mesh decoding apparatus of FIG. 11, in detail.

Referring to FIG. 12, the vertex decoding unit 1130 may include a segmentation unit 1210, a matrix generating unit 1220, a domain inverse-transforming unit 1230, a dequantization unit 1240, and a geometric information restoring unit 1250.

The segmentation unit 1210 may segment a restored base mesh into at least one area.

The matrix generating unit 1220 may generate a covariance matrix for each segmented area. In this instance, although geometric information of eliminated vertices may not be known from the restored base mesh, connectivity information may be obtained based on the restored base mesh, and thus, a covariance matrix identical to a covariance matrix of the described encoding apparatus may be constructed.

The dequantization unit 1240 may extract a dequantized coefficient by dequantizing a quantized coefficient extracted through entropy-decoding The domain inverse-transforming unit 1230 may perform domain inverse-transform based on the dequantized coefficient and the covariance matrix. In this instance, 3D local coordinates of the eliminated vertices may be generated based on the domain inverse-transform.

The geometric information restoring unit 1250 may restore geometric information associated with the eliminated vertices. In this instance, the geometric information restoring unit 1250 may generate 3D global coordinate data based on 3D local coordinate data, thereby generating data of the eliminated vertices.

The mesh restoring unit 1140 may restore the 3D mesh based on restored vertex data and the base mesh.

Omitted descriptions in descriptions with reference to FIGS. 7 through 12 may be understood based on the descriptions with reference to FIGS. 1 through 6.

As described in the above descriptions, a compression rate of a 3D mesh may be increased by constructing a covariance matrix based on a topological distance between vertices, and by compressing changed 3D location information after changing the 3D location information of the vertices into a form for an easy compression.

A local coordinate is used for estimation of geometric information, and a direction of local coordinates between adjacent triangles is maintained to be constant, and thus, a probability distribution area may decrease and a compression efficiency may increase.

A compression rate of a 3D graphic data may dramatically increase.

A probability distribution area of a residual vector of during estimation of geometric information of the 3D graphic data may decrease and thus, a compression efficiency may increase.

A complexity of a domain-transform may decrease and thus, a compression efficiency may increase.

The method for compressing a 3D mesh according to the above-described example embodiments may also be implemented through computer readable code/instructions in/on a medium, e.g., a computer readable medium, to control at least one processing element to implement any above described embodiment. The medium can correspond to medium/media permitting the storing or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, example embodiments can also be implemented as hardware, e.g., at least one hardware based processing unit including at least one processor capable of implementing any above described embodiment.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method of compressing a 3D mesh, the method comprising:
   simplifying a mesh by eliminating a plurality of vertices; and
   generating a covariance matrix using the plurality of vertices, the generating comprising evaluating at least one topological distance among the plurality of eliminated vertices.

2. The method of claim 1 further comprising:
   partitioning the simplified mesh into a plurality of segments.

3. The method of claim 2, wherein each of the plurality of segments contains less than the predefined number of vertices.

4. The method of claim 1, wherein the covariance matrix is $$M = \begin{bmatrix} 1 & \cdots & \rho^{N_{1j}} & \cdots & \rho^{N_{1m}} \\ \vdots & \ddots & \rho^{N_{ij}} & & \vdots \\ \rho^{N_{i1}} & \cdots & 1 & \cdots & \rho^{N_{im}} \\ \vdots & \rho^{N_{ji}} & & \ddots & \vdots \\ \rho^{N_{m1}} & \cdots & \rho^{N_{mj}} & \cdots & 1 \end{bmatrix},$$

ρ denotes a correlation coefficient having a value equal or less than 1, and $N_{ij}$ denotes the at least one topological distance among the plurality of eliminated vertices.

5. The method of claim 1 further comprising:
   calculating at least one eigenvector by performing eigenvector decomposition of the covariance matrix.

6. The method of claim 1 further comprising:
   calculating a coefficient of KL transform by using at least one eigenvector and at least one residual vector.

7. The method of claim 1 further comprising:
   calculating a coefficient of KL transform by using $y = U^T x$, wherein x is a vector obtained from at least one residual vector, y is the coefficient of KL transform, and U has column vectors, which are the eigenvectors.

8. The method of claim 7 further comprising:
   estimating the at least one residual vector.

9. The method of claim 7 further comprising:
   quantizing the calculated coefficient of KL transform.

10. The method of claim 1 further comprising:
    compressing the 3D mesh by using the covariance matrix.

11. A method of compressing a 3D mesh, the method comprising:
    generating a simplified mesh by simplifying an inputted 3D mesh, thereby eliminating at least one vertex;
    generating a covariance matrix using the at least one vertex; and
    coding the simplified mesh thereby generating a bitstream comprising information regarding the simplified mesh, the information comprising connectivity information of the simplified mesh and geometric information of the simplified mesh.

* * * * *